(12) United States Patent
Okubo

(10) Patent No.: US 7,928,622 B2
(45) Date of Patent: Apr. 19, 2011

(54) BRUSHLESS MOTOR WITH SKEWED ROTOR SEGMENTS

(75) Inventor: Masayuki Okubo, Kiryu (JP)

(73) Assignee: Mitsuba Corporation, Gunma (JP)

( * ) Notice: Subject to any disclaimer, the term of this patent is extended or adjusted under 35 U.S.C. 154(b) by 144 days.

(21) Appl. No.: 12/379,596

(22) Filed: Feb. 25, 2009

(65) Prior Publication Data
US 2009/0224619 A1 Sep. 10, 2009

(30) Foreign Application Priority Data
Mar. 5, 2008 (JP) .................................. 2008-054774

(51) Int. Cl.
*H02K 1/27* (2006.01)
(52) U.S. Cl. .............................. 310/156.47; 310/156.25
(58) Field of Classification Search ............. 310/156.25, 310/156.36, 156.37, 156, 38, 156.47, 216.074
See application file for complete search history.

(56) References Cited

U.S. PATENT DOCUMENTS

| | | | | |
|---|---|---|---|---|
| 5,355,044 A | * | 10/1994 | Uchida et al. ................. | 310/162 |
| 6,034,459 A | * | 3/2000 | Matsunobu et al. ..... | 310/156.38 |
| 6,104,117 A | * | 8/2000 | Nakamura et al. ..... | 310/216.074 |
| 6,252,323 B1 | * | 6/2001 | Nishikawa et al. ...... | 310/156.01 |
| 6,462,452 B2 | * | 10/2002 | Nakano et al. ........... | 310/156.47 |
| 6,867,524 B2 | * | 3/2005 | Liang ....................... | 310/156.47 |
| 2003/0011272 A1 | * | 1/2003 | Kataoka et al. ............... | 310/254 |
| 2005/0023919 A1 | * | 2/2005 | Nakano et al. ........... | 310/156.47 |
| 2005/0121990 A1 | * | 6/2005 | Kaneko .................... | 310/156.47 |

FOREIGN PATENT DOCUMENTS

| | | |
|---|---|---|
| JP | 2004-274963 | 9/2004 |
| JP | 3599066 | 9/2004 |
| JP | 2006-174692 | 6/2006 |

\* cited by examiner

*Primary Examiner* — Quyen Leung
*Assistant Examiner* — Naishadh N Desai
(74) *Attorney, Agent, or Firm* — Wenderoth, Lind & Ponack, L.L.P.

(57) ABSTRACT

In a brushless motor including a rotor having 2n magnetic poles and a stator having 3n slots, the magnetic poles of the rotor are composed of segment magnets arranged in three columns extending in an axial direction. The magnets of each column are displaced from the magnet of either adjacent column in a circumferential direction, forming a 3-stage step-skew structure. The segment magnets have a skew angle θskew ranging from 36° to 57° in terms of electrical angle.

4 Claims, 7 Drawing Sheets ed at high flux density have been increasingly used as rotor magnet in brushless motors designed for use in EPS apparatuses, thereby to meet the demand that the motors should be smaller and should yet achieve a large output. However, the segment magnets may have bands not magnetized as shown in FIG. 10 if skew-magnetized. Inevitably, the magnet material is wasted in any motor using segment magnets. Consequently, the motor involves the problem of cost-performance.

BRUSHLESS MOTOR WITH SKEWED ROTOR SEGMENTS

BACKGROUND OF THE INVENTION

1. Field of the Invention

The present invention relates to a brushless motor that has a skew structure. More particularly, the invention relates to a brushless motor having a step-skew structure by means of segment magnets.

2. Related Art Statement

Hitherto, harmonic components have been used in brushless motors for use in electric power steering (EPS) apparatuses, changing the waveform of the line induced voltage between any adjacent lines to a trapezoidal waveform to increase the rate of utilization of motor induced voltage so that the motors may be small and generate a large output as demanded. Generally, the voltage induced in a brushless motor can contain a prominent fifth harmonic component and a prominent seventh harmonic component if the motor has an integral multiple of 2 poles and 3 slots (this will be hereinafter called "2P3S×n"). If the induced voltage contains a fifth harmonic component, in particular, it will have a trapezoidal waveform. Accordingly, in a brushless motor for use in EPS apparatuses, the 2P3S×n structure is used and a fifth harmonic component is contained in the induced voltage, in order to increase the output of the brushless motor, while reducing torque ripple.

Hitherto known, as a technique for containing a fifth harmonic component in the induced voltage to change the waveform of the induced voltage to a trapezoidal one, is the skew structure in which the rotor poles or the like are inclined to the axis of the rotor. In most brushless motors of skew structure, ring magnets are used as pole magnets. In any motor having ring magnets, the magnets themselves are skew-magnetized in order to reduce cogging torque and torque ripple.

In recent years, the segment magnets that can be magnetized at high flux density have been increasingly used as rotor magnet in brushless motors designed for use in EPS apparatuses, thereby to meet the demand that the motors should be smaller and should yet achieve a large output. However, the segment magnets may have bands not magnetized as shown in FIG. 10 if skew-magnetized. Inevitably, the magnet material is wasted in any motor using segment magnets. Consequently, the motor involves the problem of cost-performance.

In any motor that has segment magnets, the magnetized segment magnets are therefore stacked one on another, thus achieving a so-called step skew in order to achieve a skew structure. In the motor with the step-skew structure, the segment magnets are arranged in even-number stages (usually, two stages), in the axial direction in order to offset the cogging waves at the respective steps to reduce the cogging torque. Patent Document 1 discloses a rotating electrical machine in which magnets are arranged in two stages. In the rotating electrical machine disclosed in the patent, the magnets of each stage are arranged in the circumferential direction, each magnet being shifted at a specific angle from the next. The poles of the rotor are thereby displaced stepwise in the axial direction, whereby a two-staged, step-skew structure is constructed.

In the step-skew structure, however, assembled state, physical properties, process precision, and the like actually have a variation from the design specification. Inevitably, the cogging torque cannot be reduced so much in the two-staged, step-skew structure. Also, if the skew angle is set to a value close to theoretical mechanical skew angle=360°/(the common least multiple of the poles and slots), the higher harmonic components of the induced voltage will abruptly decrease. In view of this, the skew angle is usually set to a value smaller than the theoretical mechanical skew angle. However, such a small skew angle can hardly serve to reduce the cogging torque resulting from the two-stage step-skew structure.

Also, in order to reduce the cogging torque, a technique is widely used in which auxiliary grooves are made in the distal end of each stator core teeth, thereby providing pseudo slots. If the fundamental wave contains harmonic components resulting from the auxiliary slots, however, the cogging torque will increase in the two-stage step-skew structure. Any motor for use in EPS apparatuses, in particular, must be so designed, not only to generate a large output, but also to reduce the cogging torque and torque ripple. Therefore, it is important for such a motor to generate a large output and, at the same time, reduce the cogging torque and torque ripple.

SUMMARY OF THE INVENTION

An object of the present invention is to provide a brushless motor that can be easily assembled, while suppressing the influence of the deviation of assembly precision and skew angle, and that can produce a larger output than the conventional motors of rotor-skew structure having a ring magnet.

A brushless motor according to this invention includes a rotor having 2n magnetic poles (n being a positive integer), and a stator having 3n slots. The magnetic poles of the rotor are composed of segment magnets arranged in three columns extending in an axial direction. The magnet of each column is displaced from the magnet of either adjacent column in a circumferential direction, thus forming a step-skew structure.

In the present invention, using a three-stage skew structure in a 2P3S×n structure motor, the line induced voltage can contain the fifth harmonic component, and the waveform of the voltage can be changed to a trapezoidal waveform. This can reduce the cogging torque and enhance the output torque while decreasing the number of magnets stacked to a minimum.

In the brushless motor, the segment magnets may have a skew angle θskew ranging from 36° to 57° in terms of electrical angle. This renders the fifth harmonic component more prominent in the induced voltage, which contributes to making the waveform of the voltage trapezoidal. Further, in the brushless motor, the ratio of the fifth harmonic component to the fundamental waveform of the line induced voltage between any adjacent lines of the stator may be set to 4.5% to 6.5%. This can efficiently render the waveform of the line induced voltage trapezoidal, and can reduce the torque ripple.

Moreover, since the brushless motor can achieve a low cogging torque, a small torque ripple, and a large output, which are well balanced with one another, the motor is fit for use as a drive source in electric power steering apparatuses. Accordingly, if used as the drive source in the electric power steering apparatus, the motor will serve to make the apparatus small and light, without impairing the steering feeling.

DETAILED DESCRIPTION OF THE PREFERRED EMBODIMENTS

Figure 1:
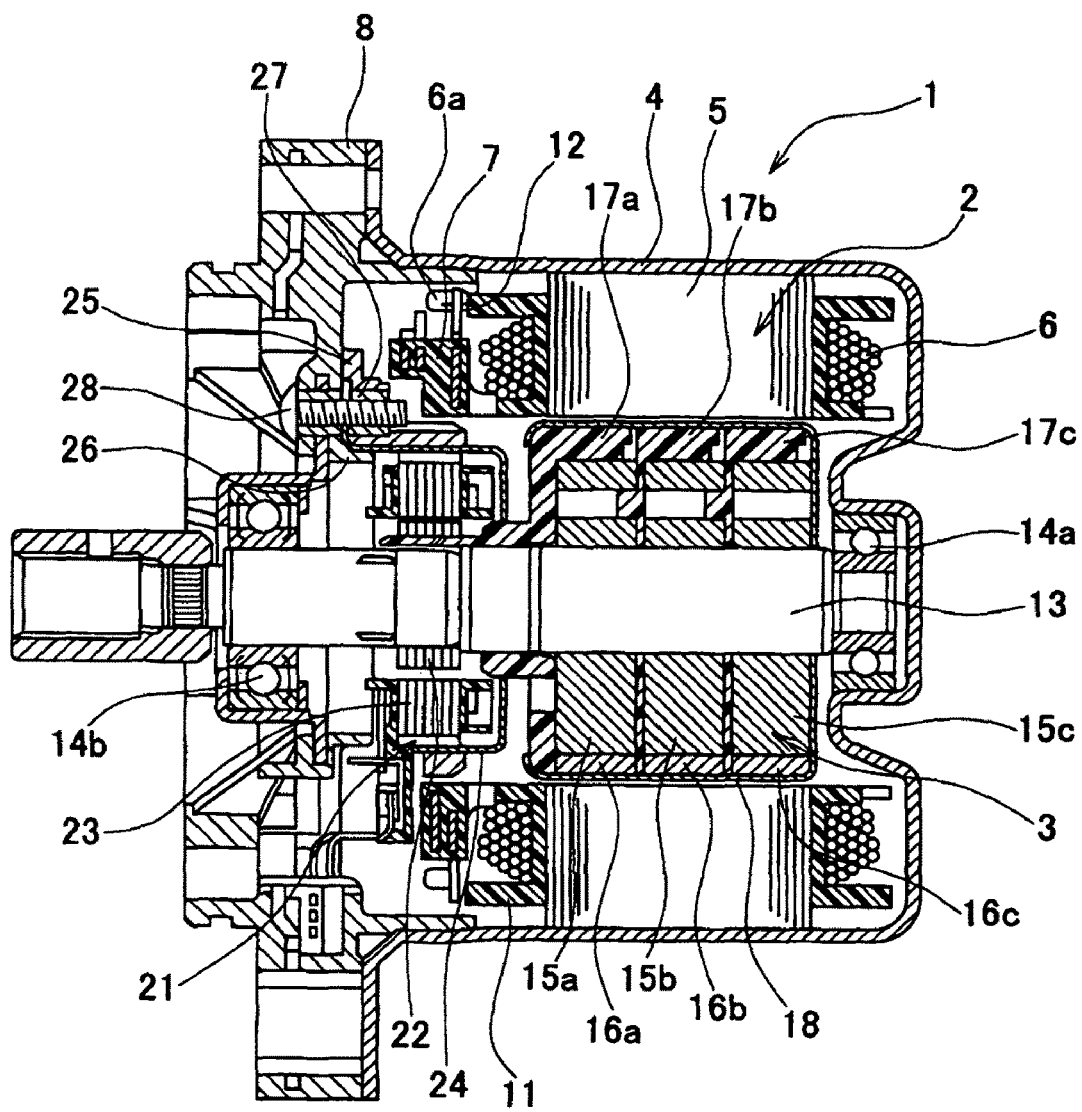
FIG. 1 is a sectional view of a brushless motor according to an embodiment of the present invention.

An embodiment of the present invention will be described in detail, with reference to the accompanying drawings. FIG. 1 is a sectional view of a brushless motor according to an embodiment of the present invention. As shown in FIG. 1, the brushless motor 1 (hereinafter referred to as "motor 1") is an inner-rotor type that has a stator 2 and a rotor 3 arranged in the stator 2. For example, the motor 1 may be used as the power source of an electric power-steering (EPS) apparatus of column-assist type. The motor 1 can apply an auxiliary drive force to the steering shaft. The motor 1 is secured to a speed-reducing mechanism, which is in turn coupled to the steering shaft. The speed-reducing mechanism reduces the rotational speed of the motor 1 and transmits the rotation to the steering shaft.

The stator 2 includes a case 4, a stator core 5, stator coils 6, and a bus-bar unit (terminal unit) 7. The stator coils 6 (hereinafter called "coils 6") are wound around the stator core 5. The bus-bar unit 7 is attached to the stator core 5. The case 4 is a bottomed hollow cylinder made of iron or the like. The case 4 has openings. In the openings, brackets 8 made of die-cast aluminum are fitted. The brackets 8 are secured to the case 4 with fastening screws (not shown).

Figure 2:
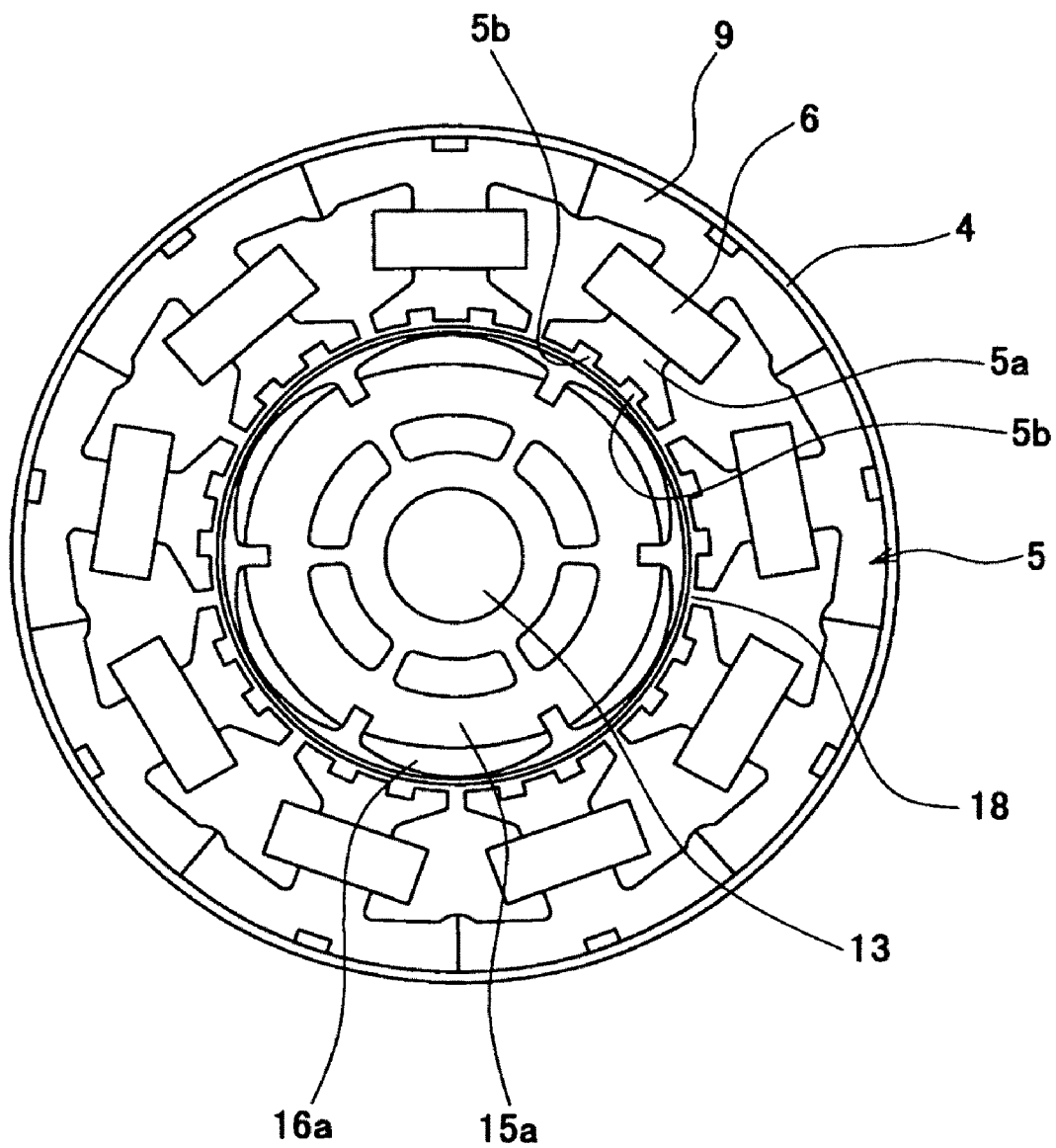
FIG. 2 is a diagram explaining the configuration of the stator of the motor of FIG. 1.

As shown in FIG. 2, the stator core 5 is composed of core segments 9 (nine segments, in this embodiment) that are arranged in the circumferential direction. The stator core 5 has nine teeth 5a that project inside in the radial direction. The distal end of the stator core 5 has 2n grooves 5b (two grooves, in this embodiment). The grooves 5b are designed to reduce cogging torque resulting from pseudo slot effect. Each core segment 9 has been produced by stacking core pieces (i.e., electromagnetic steel plates). An insulator 11 made of synthetic resin surrounds the core segments 9.

The coils 6 are wound around the insulator 11. One end part 6a of each coil 6 is lead at the one end of the stator core 5. The bus-bar unit 7 is secured to the one end of the stator core 5. Bus bars made of copper are inserted in the casing of the bus-bar unit 7 that is made of synthetic resin. From the circumferential surface of the bus-bar unit 7, a plurality of power supply terminals 12 protrude in the radial direction. The end part 6a of each coil 6 has been welded to the power supply terminals 12 at the time of fastening the bus-bar unit 7. The bus-bar unit 7 has as many bus bars as the number of phases of the motor 1, in this embodiment, three bus bars are provided for U, V and W phases, respectively). Each coil 6 is electrically connected to the power supply terminal 12 for the associated phase. The stator core 5 has been press-fitted and fixed in the case 4 after the bus-bar unit 7 had been fastened.

Figure 3:
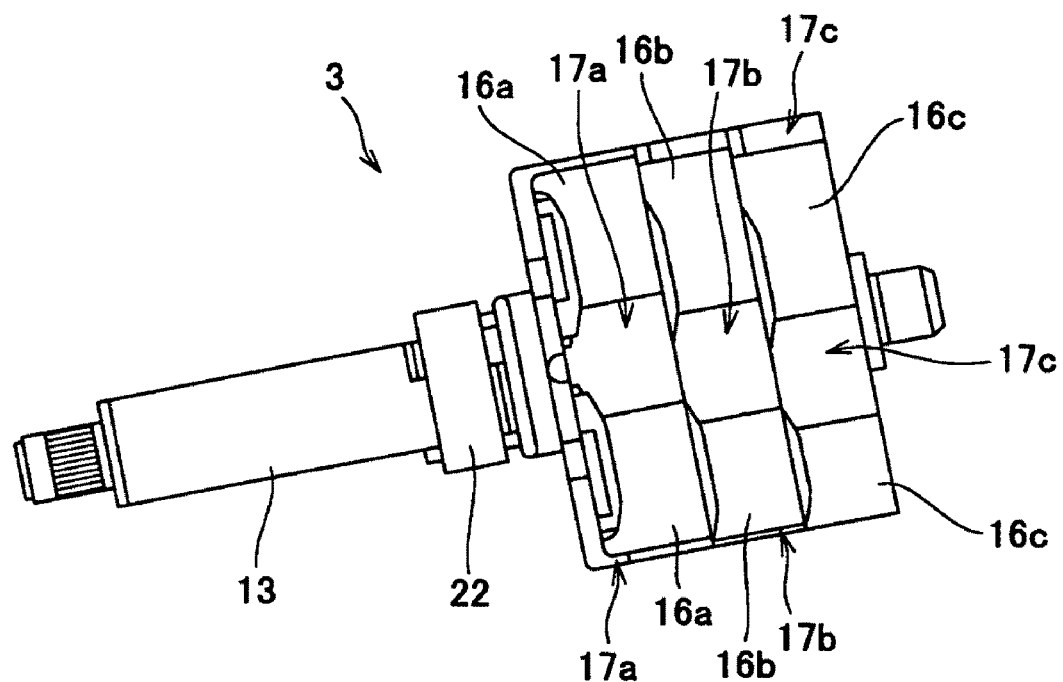
FIG. 3 is a diagram explaining the configuration of the rotor of the motor of FIG. 1.
Figure 4:
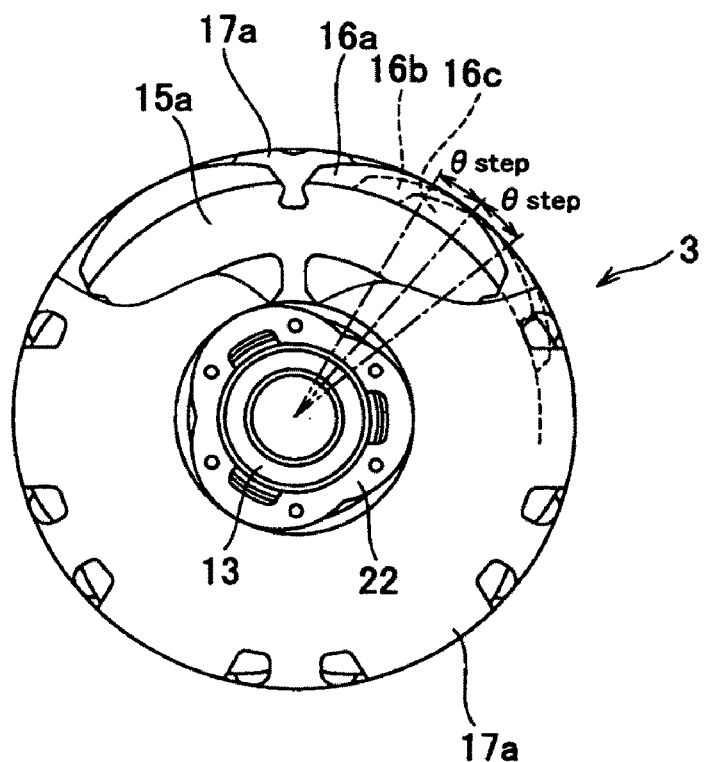
FIG. 4 is a side view (partly sectional) of the rotor, as viewed in the direction of arrow X in FIG. 3.

The rotor 3 is inserted in the stator 2. FIG. 3 is a diagram explaining the configuration of the rotor 3. FIG. 4 is a side view (partly sectional) of the rotor, as viewed in the direction of arrow X in FIG. 3. The rotor 3 has a rotor shaft 13. The rotor shaft 13 can freely rotate, supported by bearings 14a and 14b. The bearings 14a and 14b are fastened to the center part of the bottom of the case 4 and the center part of the bracket 8, respectively. On the rotor shaft 13, a hollow cylindrical rotor core 15 (15a to 15c) is secured. To the outer circumferential surfaces of the rotor cores 15a to 15c, a segment-type magnet (permanent magnet) 16 (16a to 16c) is fastened. In the motor 1, magnets 16a to 16c are arranged in six rows and three columns along the circumferential direction. That is, the motor 1 has a six-pole, nine-slot structure (hereinafter referred to as "6P9S"). A magnet cover 18, which is a bottomed hollow cylinder, is provided, surrounding the magnets 16a to 16c. Note that, FIG. 3 shows the rotor 3 from which the magnet cover 18 bas been removed.

Magnet holders 17a to 17c made of synthetic resin are secured to the outer sides of the magnets 16a to 16c. As shown in FIG. 4, the magnets 16a to 16c are held by the magnet holders 17a to 17c. The magnet holders 17a to 17c are attached to the outer circumferences of the rotor cores 15a to 15c. In the motor 1, the magnets 16a to 16c, i.e., three columns of magnets, are arranged in the axial direction, while held by the magnet holders 17a to 17c. As FIG. 3 shows, the magnets 16a to 16c of each column are displaced from the magnets of any adjacent column having the same polarity in the circumferential direction by a predetermined step angle θstep (the angle between centers of adjacent column magnets). Thus, the rotor 3 of the motor 1 has a step-skew structure, in which the three magnets 16a to 16c of each column are stacked one on another.

Figure 5:
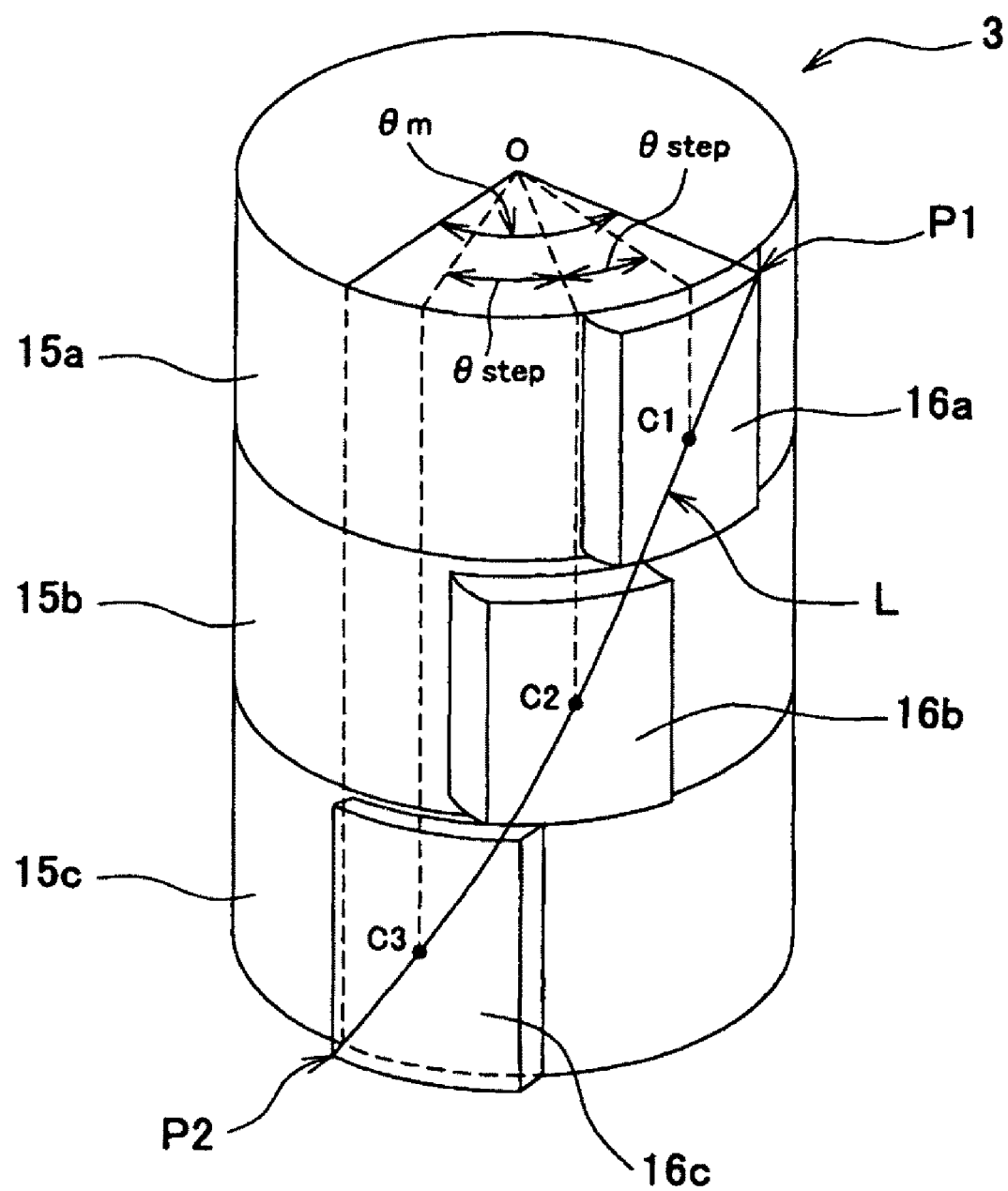
FIG. 5 is a diagram explaining the skew angle the rotor has.

FIG. 5 is a diagram explaining the skew angle of the rotor 3. As shown in FIG. 5, in the step-skew structure, the line L connecting the centers C1 to C3 of the magnets 16a to 16c (in both the circumferential direction and the axial direction) intersects with the outer ends of the magnets 16a and 16c at points P1 and P2, respectively. The center angle to the center O of rotation between the points P1 and P2 is the magnet skew angle. Hence, the step angle θstep between the magnets 16a and 16b is a center angle between the points C1 and C2 to the center O of rotation, and the step angle θstep between the magnets 16b and 16c is a center angle between the points C2 and C3 to the center O of rotation. The center angles between the points C1 and P1, C3 and P2 are half the step angle θstep (i.e., θstep/2) respectively. Therefore, the skew angle θskew is θstep×(number of magnets stacked−1)+(θstep/2)× 2=θstep×number of magnets stacked.

A rotor 22 (resolver rotor) of a resolver 21 used as means for detecting a rotation angle is attached to the end of the magnet holder 17a. By contrast, the stator 23 (resolver stator) of the resolver 21 is pressed into a resolver holder 24 made of metal and held in a resolver bracket 25 made of synthetic resin. The resolver holder 24 is a bottomed hollow cylinder. The resolver holder 24 is press fitted lightly on the outer circumferential surface of a rib 26, which is provided on the center part of the bracket 8. A female screw 27 made of metal is inserted in the resolver bracket 25 and bracket 8. A holding screw 28 is screwed in the female screw 27 from the outside the bracket 8. The resolver 24 is thereby secured in the bracket 8.

In the motor 1 (motor of 6P9S structure) according to the invention, the skew angle θskew=step angle θstep×number of stages (number of magnets stacked−1) is set to 36° to 57°

Figure 6:
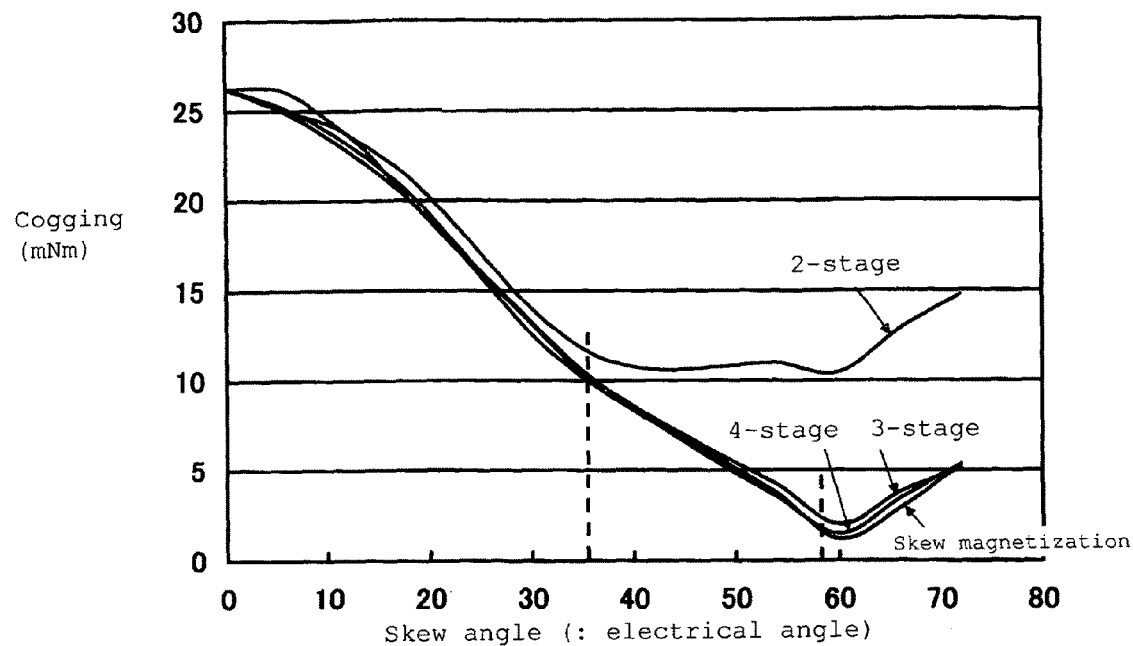
FIG. 6 is a diagram explaining the relation between the skew angle and the cogging torque.

(electrical angle; 12° to 19° in terms of mechanical angle). As described above, the theoretical skew angle at which cogging torque is zero is 360°/the common least multiple of the poles and slots in the 6P9S-structure motor. In the case of the motor 1, the theoretical skew angle at which the cogging torque is zero (0) is 360°/18=20° (mechanical angle; 60° in terms of electrical angle). FIG. 6 is a diagram representing the relation between the skew angle and the cogging torque. As seen from FIG. 6, the cogging torque is minimal at the skew angle (electrical angle) of 60°. At any angles smaller than 60°, the smaller the skew angle, the larger the cogging torque.

As seen from FIG. 6, the cogging torque is less prominent for the three-stage step-skew and the four-stage skew-skew (hereinafter called "3-stage skew" and "4-stage skew", respectively) than for the two-stage step-skew (hereinafter called "2-stage skew") and the cogging torque for the 3-stage skew and the 4-stage skew are greatly suppressed to almost to the same value as the rotor skew (if the number of magnets stacked is assumed as infinite). The cogging torque for the skew of three or more stages scarcely changes, irrespective of the number of magnets stacked. The cogging torque for the 2-stage skew and the cogging torque for the skew of three or more stages deviate gradually from each other, staring at a skew angle near 35°.

Figure 7:
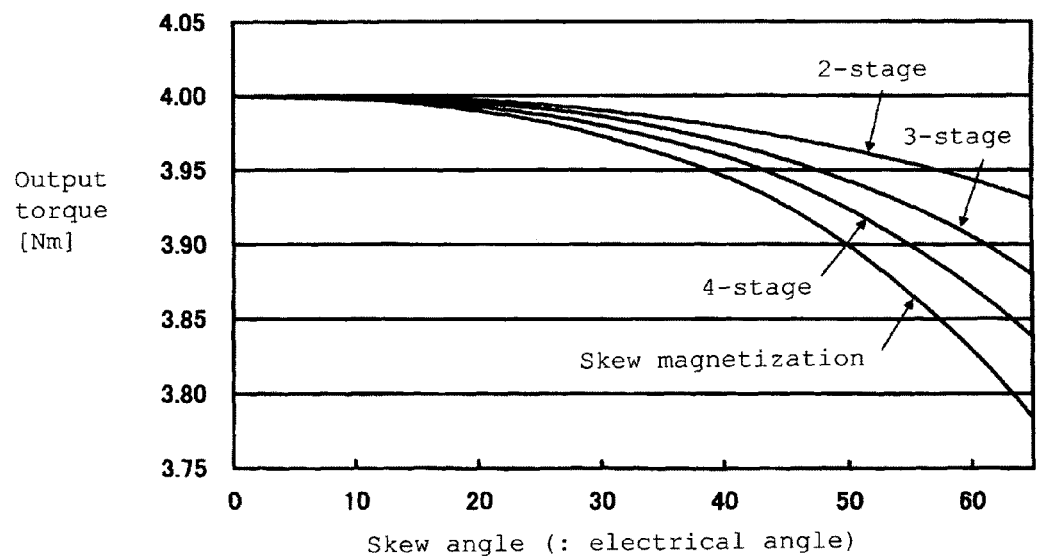
FIG. 7 is a diagram explaining the relation between the skew angle θskew (electrical angle) and the motor-output torque.

Next, consider the relation between the skew angle θskew and the output torque. The larger the skew angle θskew, the smaller the output torque will become, particularly if the number of magnets stacked is large this tendency is of particular note. FIG. 7 is a diagram explaining the relation between the skew angle θskew (electrical angle) and the motor-output torque. As seen from FIG. 7, the voltage-use efficiency is extremely high in the 2-stage skew, thus capable of generating a large torque. If the number of magnets stacked increases, however, the output torque will decrease in proportion.

In the motor 1, the number of magnets stacked is set to three in view of the following:
(1) In the 2-stage skew, the cogging torque cannot be reduced enough, because the assembly precision, the skew angle and the number of pseudo slots deviate from the design values.
(2) As seen from the result of FIG. 6, a step-skew structure having three or more stages is preferable in order to reduce the cogging torque.
(3) Similarly, the cogging torque reducing effect is almost the same extent in the skew of three or more stages, but the 3-stage skew is preferable considering the labor hour of assembling.
(4) As seen from the result of FIG. 7, in the step-skew structure, the voltage-use efficiency is high and a large torque is obtained compare to skew magnetizing.
(5) However, the larger the number of magnets stacked, the lower the voltage-use efficiency will be, and the smaller the output torque will be.
(6) In view of these points, the 3-stage skew is the most balanced in terms of cogging torque and output torque.

Figure 8:
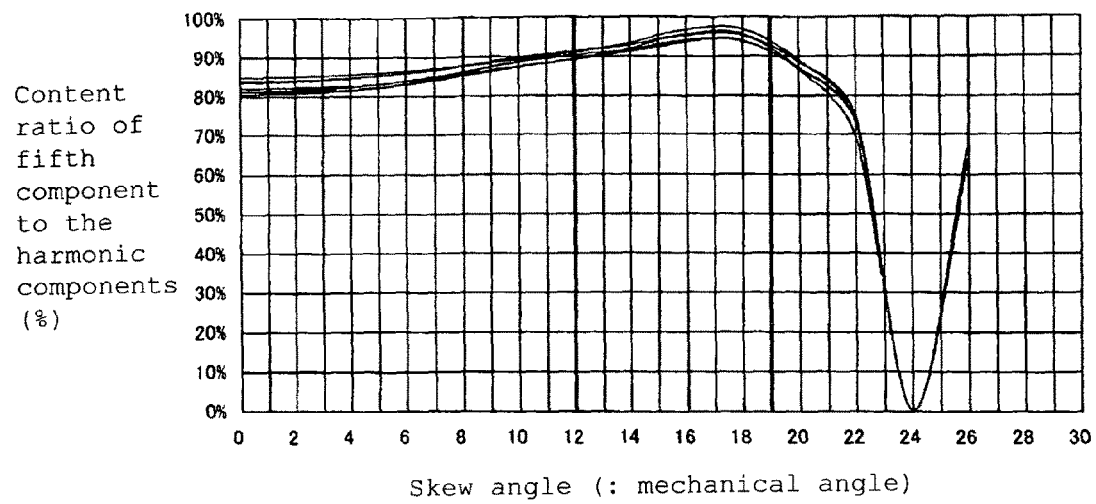
FIG. 8 is a graph representing the relation between the skew angle (mechanical angle) and the ratio of the fifth harmonic component to all harmonic components, which is observed in a 6P9S-structure motor.

FIG. 8 is a graph representing the relation between the skew angle (mechanical angle) and the ratio of the fifth harmonic component to all harmonic components, which is observed in a 6P9S-structure motor. As FIG. 8 shows, the larger the skew angle, the higher the content of the fifth harmonic component will become. When the skew angle exceeds 18°, however, the content of the fifth harmonic component starts decreasing. When the skew angle exceeds 22°, the content of the fifth harmonic component sharply decreases. Assume that effective range of the content of the fifth harmonic component is 90% or more, the skew angle θskew (mechanical angle) should be: 12°≦θskew (mechanical angle)≦19° in 6P9S structure. Namely, in the motor of 2P3S×n structure, the skew angle (electrical angle) θskew is 36°≦θskew (electrical angle)≦57°. In consideration of both the result of FIG. 8 and the results of FIGS. 6 and 7, the inventors hereof set the motor 1 to a skew angle θskew to 36° to 57° (electrical angle), at which the cogging torque was 10 mNm or less. FIG. 8 shows the results of the research the inventors conducted on motors that differ in magnet width and eccentricity of the inside and outside diameters. The relation between the skew angle and the ratio of the fifth harmonic component was similar for magnets of various configurations.

As described above, the brushless motor of the present invention firstly uses the 2P3S×n structure which makes an induced voltage a trapezoidal waveform by including the fifth harmonic component so that the torque ripple may be reduced. In addition to this, considering cogging and output torque, a 3-stage structure, which is well balanced in cogging torque and output torque, is employed in order to suppress, as much as possible, the decrease of the voltage-use efficiency resulting from the increase in the number of magnets stacked. Further, the skew angle θskew is set to an electrical angle of 36° to 57° in consideration of the content ratio of the fifth harmonic component that contributes to a line induced voltage to have a trapezoidal waveform. This can efficiently change the waveform of line induced voltage to a trapezoidal one and can reduce the torque ripple and can reduce the cogging torque and enhance the output torque, while minimizing the number of magnets stacked. A large-output, high-performance brushless motor can thus be provided, which is easy to assemble and inexpensive.

Figure 9:
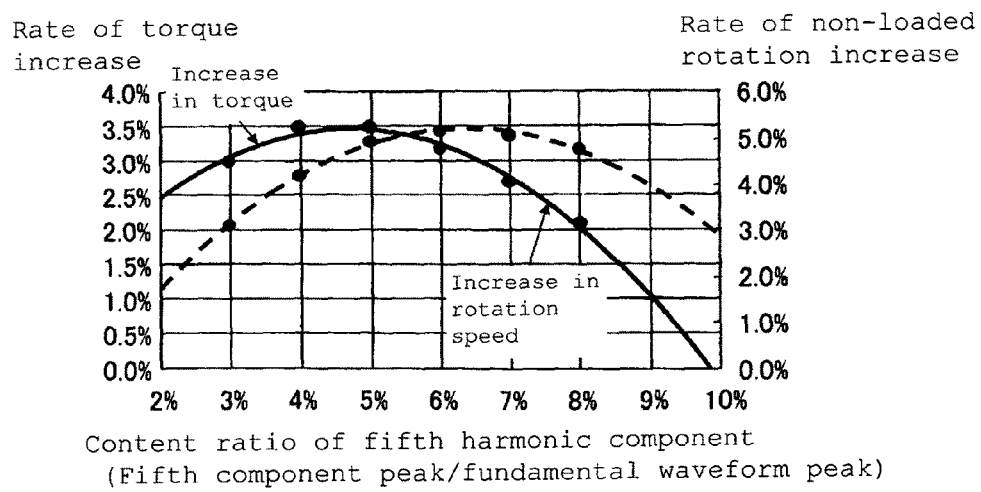
FIG. 9 is a graph representing the relation between the content ratio of the fifth harmonic component and the rate of torque increase and the rate of rotation speed increase during a sine-wave drive.
Figure 10:
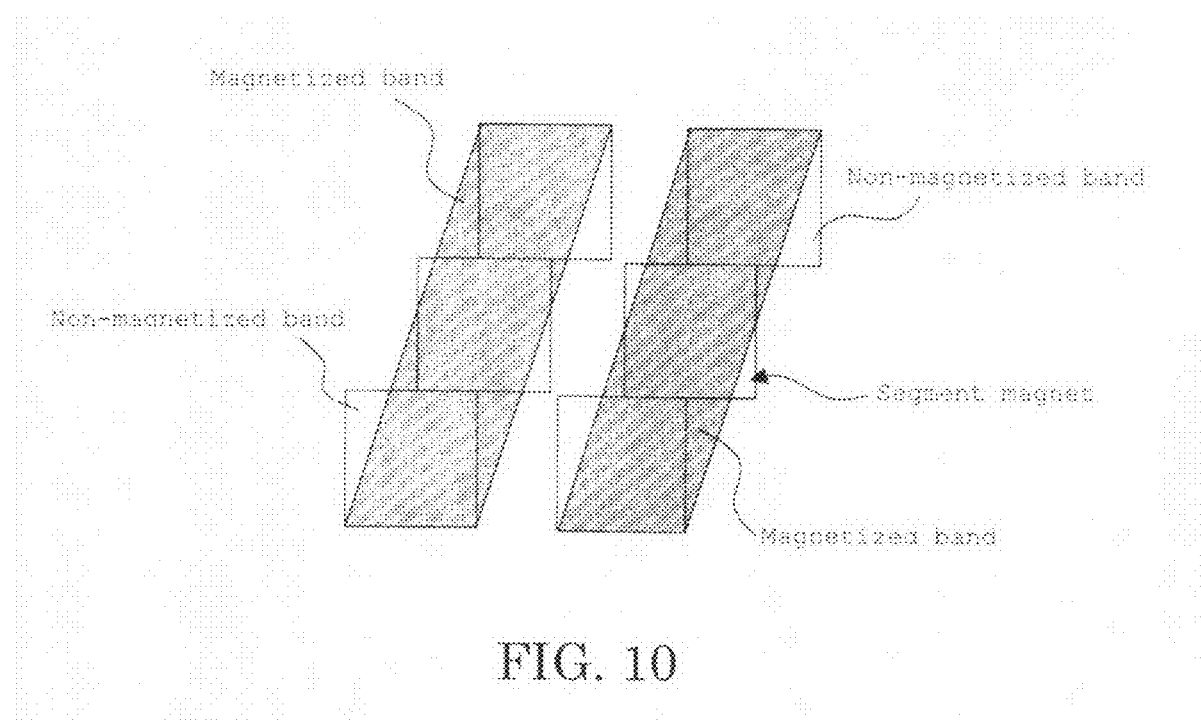
FIG. 10 is a diagram explaining those regions of segment magnets, which are not magnetized when skew magnetization is performed on the segment magnets.

FIG. 9 is a graph illustrating how much the torque and the rotation speed have increased during a sine-wave drive, by virtue of the induced voltage containing the fifth harmonic component (in other words, FIG. 9 represents the relation between the content ratio of the fifth harmonic component and the rate of torque increase and the rate of rotation speed increase). As evident from FIG. 9, the more the fifth harmonic component increases, the larger the output torque will be and the greater the rotation speed will be. Nonetheless, when the output torque and the rotation speed exceed particular values, the rates at which they increase start lowering. Moreover, since the torque increase rate and the rotation speed increase rate are different from each other, the former attains a maximum increase of about 5%, and the latter a maximum increase of about 6.5%. The inventors therefore regarded the ranges in which the both rates can be secured a rate of 3% or more, as being effective. The inventors accordingly determined that the content of fifth harmonic component should best be 4.5% to 6.5% to balance the output torque with the rotation speed. Thus, both the output torque and the rotation speed can be effectively increased more than in the sine-wave drive.

The present invention is not limited to the embodiment described above. Of course, various changes and modifications can be made within the scope and spirit of the invention.

For example, the present invention can be applied to a brushless motor of any other type for use in EPS's, though the embodiment described above is one designed for use in EPS's of column-assist type. In addition, the invention is not limited to motors for use in EPS's and various vehicles. Rather, the invention can be applied to brushless motors of various types. The embodiment described is a 6-pole, 9-slot brushless motor having six magnets. Nevertheless, neither the number of magnets nor the number of slots is limited. In this case, in a motor of integral multiple of 2P3S, a skew angle is set to the range from 60° to 75° (electrical angle).

What is claimed is:

1. A brushless motor comprising:
a rotor having 2n magnetic poles (n being a positive integer); and
a stator having 3n slots, wherein
the magnetic poles of the rotor are composed of segment magnets arranged in three columns extending in an axial direction, each of the columns having segment magnets arranged such that the segment magnets of each column are offset from the segment magnets of either adjacent column in a circumferential direction so as to form a step-skew structure, and
the segment magnets are arranged so that the step-skew structure has a skew angle θskew ranging from 36° to 57° in terms of electrical angle such that a content of a fifth harmonic component relative to all harmonic components is at least 90%.

2. A brushless motor comprising:
a rotor having 2n magnetic poles (n being a positive integer); and
a stator having 3n slots, wherein
the magnetic poles of the rotor are composed of segment magnets arranged in three columns extending in an axial direction, each of the columns having segment magnets arranged such that the segment magnets of each column are offset from the segment magnets of either adjacent column in a circumferential direction so as to form a step-skew structure, and
a ratio of the fifth harmonic component to the fundamental waveform of a line induced voltage of the stator is 4.5% to 6.5%.

3. The brushless motor according to claim 2, wherein
the brushless motor is designed for use as a drive source in electric power steering apparatuses.

4. The brushless motor according to claim 1, wherein
the brushless motor is designed for use as a drive source in electric power steering apparatuses.

* * * * *